Aug. 17, 1943.     K. THINIUS     2,326,899
PROCESS FOR THE MANUFACTURE OF FOILS AND TUBES
Filed Aug. 24, 1940
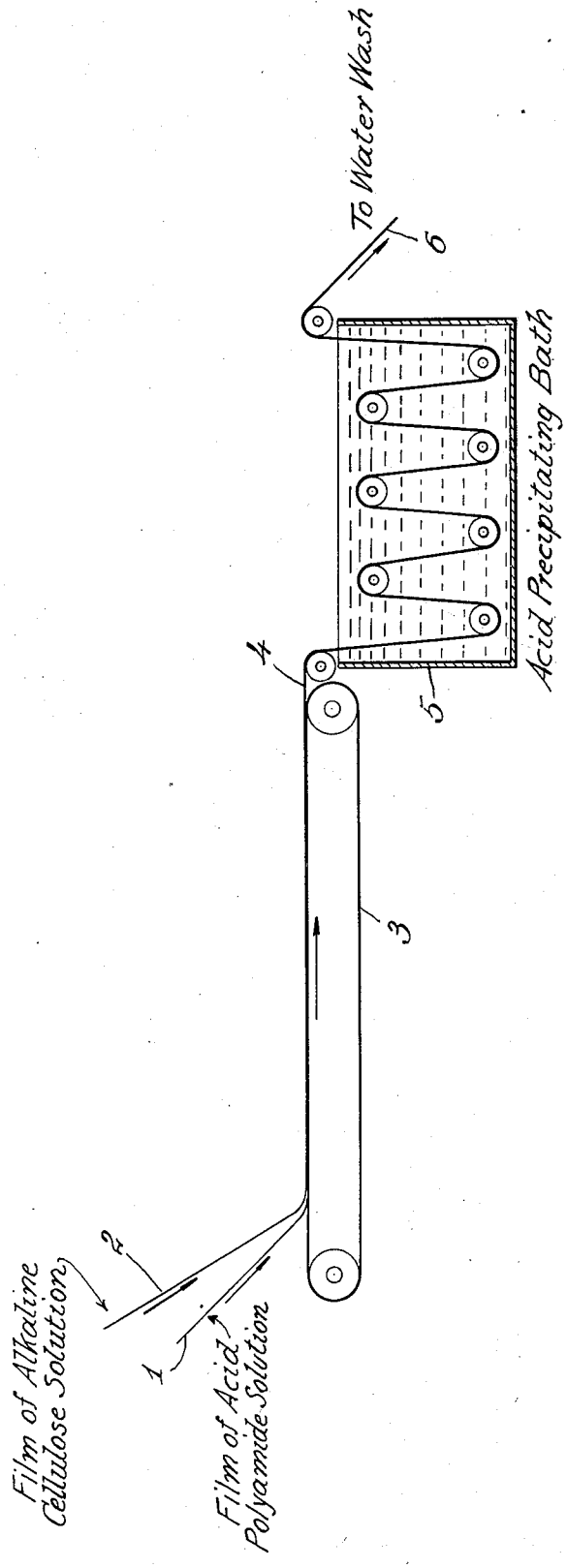
INVENTOR.
Kurt Thinius
BY
ATTORNEY Patented Aug. 17, 1943

2,326,899

UNITED STATES PATENT OFFICE 2,326,899

PROCESS FOR THE MANUFACTURE OF FOILS AND TUBES

Kurt Thinius, Eilenburg, Germany; vested in the Alien Property Custodian

Application August 24, 1940, Serial No. 354,118
In Germany August 7, 1939

6 Claims. (Cl. 99—176)

This invention relates to the manufacture of foils and tubes.

The manufacture of foils and tubes from cellulose, cellulose derivatives, gelatin and other film forming substances, for instance polyamides, is generally accomplished in a manner that solutions of the aforementioned substances are coagulated either according to the dry- or wet-process thus forming a film. It is a condition for the dry-process that the film forming substances are sufficiently soluble in the usual easily volatile organic solvents. Since with polyamides this is not the case, it was necessary to produce polyamide films from solutions and to use the solubility of the polyamides in mineral acids. Therefore, it was already proposed to form a polyamide solution, which consists of concentrated formic acid containing hydrochloric acid, into a film by evaporation on a suitable support. Furthermore it was proposed to form polyamides into structures directly from the melt without the application of solvents.

It is an object of the present invention to manufacture novel foils and tubes.

A further object is the production of new double-films and double-tubes consisting of two different materials and yielding novel products for various technical purposes.

These and other objects will be apparent from the following disclosure.

This material hitherto not known is most suitable for the production of tubes and wrapping foils for meat and sausage. It is already customary to use for that purpose foils made of cellulose, cellulose esters and occasionally also of gelatin instead of natural intestines or bladders. The wrapping foils, however, consisting of cellulose swell intensely in water and consequently are of reduced stability when wet. Also as far as their elasticity is concerned the sausage skins made of cellulose and cellulose derivatives are inferior to those of the natural intestines. As further disadvantage of these artificial sausage skins made of cellulose there is to be mentioned the limited permeability for gases and liquids, so that the fatty broth obtained in the manufacture of certain kinds of sausage during the boiling remains within the skin. In this way it is impossible to free the sausage from the fatty broth. One had already proposed to denitrate the layers obtained from nitrocellulose solutions and to produce a sausage skin therefrom which on account of its shrinking capacity follows the movement of the sausage when drying. In this way undesired wrinkles are avoided. These artificial sausage skins, however, do not possess the porosity and elasticity of the intestines.

It has been found that suitable tubes adapted for artificial sausage skins and possessing properties similar to those of the natural intestines and animal bladders are obtained, when by means of a suitable casting device a solution of polyamides in mineral acid of at least 6-times normality is covered with a layer of an alkaline solution of cellulose of a cellulose derivative, for instance of an ammoniacal copper oxide solution or a viscose solution and when both layers are conducted together into an acid precipitating bath being not sufficiently acid to dissolve the polyamide.

At the regions of contact between the acid polyamide solution and the alkaline cellulose solution a reciprocal precipitation of the polyamide and of the cellulose takes place under formation of a "mixed film." The remaining portions of the polyamide- or the cellulose solution being on top or below the so called mixed film are conducted into the acid precipitating bath and precipitated there in the form of foils. Provided the casting slot is shaped accordingly, a foil or a tube is obtained thereby, the one surface of which consists of regenerated cellulose and the other of a polyamide. According to the prevailing viscosity of the casting solution and the opening of the casting device one has it in hand to increase the thickness of the cellulose surface or that of the polyamide surface.

To use such a foil or tube as sausage skin is especially advantageous, because preferably on account of the polyamide surface a porosity and elasticity is attained being similar to that of the natural intestines. Since on the other hand also the cellulose surface shows a certain swelling capacity, part of the humidity can leave the sausage as desired within a short time. To use the double-foils as sausage skins is also advantageous when cutting the sausage, since the skin fits tightly to the sausage itself most probably caused by the shrinking capacity being present in the polyamide surface. On account of the common zone, where the polyamide layer and the cellulose layer form the mixed film increased elasticity and tenacity of the sausage skin is attained as compared with the skin obtained from pure cellulose. The increased tenacity is proved by the fact that the artificial sausage skins according to the present invention do not tear, if pierced during the boiling of the sausage.

Finally there must be mentioned that the mixed film in the region of contact gives to the sausage skin an opaque appearance similar to the natural intestines.

The polyamides are obtained in a known manner by polycondensation from bifunctional compounds, for instance by polycondensation of ω-amino carboxylic acids with more than five carbon atoms between the amino- and carboxyl groups or their amide forming derivatives, furthermore by polycondensation of α-ω-diamines with four and more atoms between the two amino groups, and dicarboxylic acids or their functional derivatives, such as esters, acid chlorides, lactams, urethanes, α-ω-dihalogen hydrocarbons.

Instead of the cellulose also its derivatives being soluble in alkali can be used, for instance oxyethyl cellulose and other ethers.

The invention is illustrated by the single figure of the accompanying drawing, in which a film of acid polyamide solution 1 and a film of alkaline cellulose solution 2 are represented as coming from a suitable extrusion machine (not shown). The film of cellulose solution is cast upon the film of polyamide solution supported on an endless moving belt 3. The resulting composite solution-film 4 is passed as a unit through an acid precipitating bath 5 consisting of one normal hydrochloric acid, for example, whereby the polyamide is precipitated and the cellulose regenerated forming a composite foil 6, which is then washed in known matter.

The invention is further illustrated by the following example:

*Example*

A 10% solution of the polycondensation product from adipic acid and hexamethylenediamine in 6n-hydrochloric acid is extruded by a two-part film casting device from the lower casting chamber, whereas a 10% cellulose solution in ammoniacal copper oxide leaves the casting slot at the upper chamber. When the layers of the two solutions cover each other, in the region of contact a reciprocal precipitation takes place. The layer thus cast is then carried on an endless ribbon (drum) as a carrier into a precipitating bath consisting of normal hydrochloric acid. Here there is precipitated the polyamide- as well as the cellulose layer. Finally the foil is washed with water in a known manner. Instead of the 6n-hydrochloric acid an 8n-sulfuric acid may serve as solvent for the polyamide, whereby the diluted sulfuric acid up to 6-times normality may be used as precipitating bath.

It is already proposed to apply later on to the inside of the sausage skins consisting of regenerated cellulose or cellulose derivatives a layer which consists of natural substances and contains ammonia-nitrogen. To apply these layers to the finished sausage skins requires, however, rather difficult mechanical devices without guaranteeing in every case the firmness of attachment of this layer to the cellulose.

In any case according to the present invention there has been described a method how to obtain by a one-step process a sausage skin consisting of two different layers.

What I claim is:

1. A process for the production of foils and tubes which comprises forming a film of an at least 6 normal mineral acid solution of a polyamide, depositing thereon a film of an alkaline solution of cellulose, and passing the solution-films as a unit through an acid precipitating bath, the acidity of which is insufficient to dissolve the polyamide.

2. A process for the production of foils and tubes which comprises forming a film of an at least 6 normal mineral acid solution of a polyamide, depositing thereon a film of an alkaline solution of a cellulose derivative, and passing the solution-films as a unit through an acid precipitating bath, the acidity of which is insufficient to dissolve the polyamide.

3. As an article of manufacture, composite foils and tubes comprising a film of polyamide and a film of regenerated cellulose, said films being joined at their interface through a region consisting of a mixture of polyamide and regenerated cellulose.

4. As an article of manufacture, composite foils and tubes comprising a film of polyamide and a film of regenerated alkali-soluble cellulose derivative, said films being joined at their interface through a region consisting of a mixture of polyamide and regenerated alkali-soluble cellulose derivative.

5. A double film sausage casing consisting of an inner film of polyamide and an outer film of regenerated cellulose, said films being joined at their interface through a region consisting of a mixture of polyamide and regenerated cellulose.

6. A double film sausage casing consisting of an inner film of polyamide and an outer film of regenerated alkali-soluble cellulose derivative, said films being joined at their interface through a region consisting of a mixture of polyamide and regenerated alkali-soluble cellulose derivative.

KURT THINIUS.